United States Patent
Yagi et al.

(10) Patent No.: US 8,946,125 B2
(45) Date of Patent: Feb. 3, 2015

(54) CONNECTION STRUCTURE FOR SUPERCONDUCTIVE CABLES, METHOD FOR LAYING THE SAME, AND METHOD FOR VACUUMING CONNECTION STRUCTURE FOR SUPERCONDUCTIVE CABLES

(75) Inventors: Masashi Yagi, Tokyo (JP); Takaharu Mitsuhashi, Tokyo (JP); Tomoya Nomura, Tokyo (JP); Taro Matsuoka, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 170 days.

(21) Appl. No.: 13/816,621

(22) PCT Filed: Jan. 26, 2012

(86) PCT No.: PCT/JP2012/051660
§ 371 (c)(1),
(2), (4) Date: Feb. 12, 2013

(87) PCT Pub. No.: WO2012/102341
PCT Pub. Date: Aug. 2, 2012

(65) Prior Publication Data
US 2013/0157867 A1 Jun. 20, 2013

(30) Foreign Application Priority Data
Jan. 27, 2011 (JP) .................................. 2011-014664

(51) Int. Cl.
*H01L 39/24* (2006.01)
*H01B 12/14* (2006.01)
(Continued)

(52) U.S. Cl.
CPC .................. *H01B 12/14* (2013.01); *H01R 4/68* (2013.01); *H02G 15/34* (2013.01); *H02G 15/18* (2013.01); *Y02E 40/648* (2013.01)
USPC ......................................................... 505/430

(58) Field of Classification Search
CPC .............. H01L 39/248; H01L 39/2419; C04B 35/4508; C04B 35/4504; C04B 35/62254
See application file for complete search history.

(56) References Cited

U.S. PATENT DOCUMENTS 6,888,060 B2 * 5/2005 Ashibe et al. ................. 174/15.3
7,102,083 B2 * 9/2006 Jang ............................ 174/125.1
(Continued)

FOREIGN PATENT DOCUMENTS

JP  50 74185     6/1975
JP  63 257136    10/1988
(Continued)

OTHER PUBLICATIONS

International Search Report Issued Feb. 28, 2012 in PCT/JP12/51660 Filed Jan. 26, 2012.

*Primary Examiner* — Colleen Dunn
(74) *Attorney, Agent, or Firm* — Oblon, Spivak, McClelland, Maier & Neustadt, L.L.P.

(57) ABSTRACT

A thermal insulation tube has a double-structure including a thermal insulation internal tube and a thermal insulation external tube, an intermediate connecting part has a double-structure including an outer container and an inner container, the internal tube and the external tube penetrate through a wall surface of the outer container and are introduced at least up to a wall surface of the inner container, a region between the internal tube and the external tube is sealed by joining an end to be introduced of the internal tube and an end to be introduced of the external tube, at an introduction portion of the external tube to be positioned on an inner side of a wall surface of the outer container, and a corrugated tubular part has a tube wall thinner than the external tube outside of the wall surface.

7 Claims, 9 Drawing Sheets

(51) Int. Cl.
*H01R 4/68* (2006.01)
*H02G 15/34* (2006.01)
*H02G 15/18* (2006.01)

(56) References Cited

U.S. PATENT DOCUMENTS 7,166,804 B2 * 1/2007 Yumura et al. ............. 174/125.1
8,280,467 B2 * 10/2012 Yuan et al. ................... 505/163
2010/0199689 A1 8/2010 Choi et al.

FOREIGN PATENT DOCUMENTS

| | | |
|---|---|---|
| JP | 2000 340274 | 12/2000 |
| JP | 2006 179355 | 7/2006 |
| JP | 2009 77594 | 4/2009 |
| JP | 2010 165552 | 7/2010 |
| JP | 2010 187520 | 8/2010 |

* cited by examiner

CONNECTION STRUCTURE FOR SUPERCONDUCTIVE CABLES, METHOD FOR LAYING THE SAME, AND METHOD FOR VACUUMING CONNECTION STRUCTURE FOR SUPERCONDUCTIVE CABLES

TECHNICAL FIELD

The invention relates to a connection structure for superconducting cables for reduction of heat invasion, a method for laying the same, and a method for vacuuming the connection structure for the superconducting cables.

BACKGROUND ART

Conventionally, there has been a known superconducting cable using a superconducting wire that can be in a superconducting state at cryogenic temperatures as a conductor. A superconducting cable is expected as a power cable capable of transmitting a large current with low loss, and has been developed for the practical use.

Figure 2:
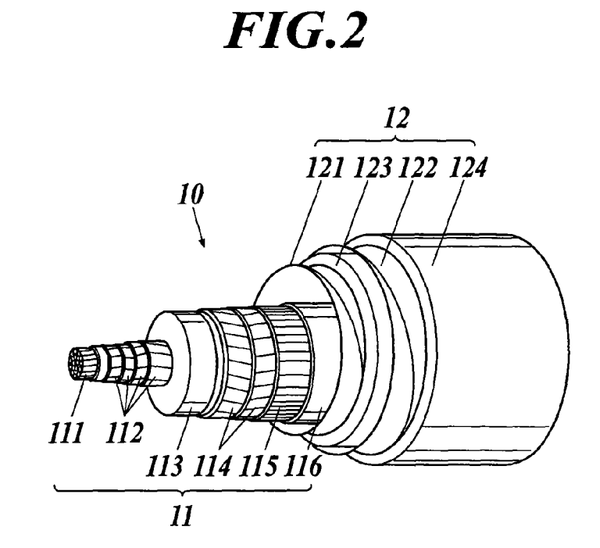
FIG. 2 is a view illustrating an example of a superconducting cable to which a terminal connecting part is fabricated.

An example of a superconducting cable is illustrated in FIG. 2. A superconducting cable 10 illustrated in FIG. 2 is a single-core superconducting cable, in which a cable core 11 as the single core is housed in a thermal insulation tube 12.

The cable core 11 is composed of a former 111, superconductive conductor layers 112, an electric insulating layer 113, superconducting shield layers 114, a normal conducting shield layer 115, a protecting layer 116, and the like. The superconductive conductor layers 112 are formed by winding a plurality of superconducting wire materials spirally on the former 111. Similarly, the superconducting shield layers 114 are formed by winding a plurality of superconducting wire materials spirally on the electric insulating layer 113.

Each of superconducting wire materials for forming the layers 112 and the superconducting shield layers 114 has a laminated structure obtained by forming an intermediate layer, a superconducting layer, a protecting layer in this order on a tape-shaped metal substrate, for example. As a superconductor for forming the superconducting layer may be a RE-based superconductor (RE: rare earth element) and a bismuth-based superconductor showing superconductivity at a liquid nitrogen temperature (−196° C. in the atmospheric pressure) or more, for example. As a RE-based superconductor, an yttrium-based superconductor (Y-based superconductor, hereinafter) expressed as the chemical formula $YBa_2Cu_3O_{7-\delta}$ is especially typical. In addition, a tape-shaped superconducting wire material, in which a superconductor is formed in a metal matrix, may be used. As a superconductor, a bismuth-based superconductor expressed by the chemical formula $Bi_2Sr_2CaCu_2O_{8+\delta}$ (Bi2212), or $Bi_2Sr_2Ca_2Cu_3O_{10+\delta}$ (Bi2223) can be used. In the chemical formula, δ indicates a nonstoichiometric amount of oxygen.

The thermal insulation tube 12 has a double tube structure constituted of an internal tube 121 and an external tube 122. Between the internal tube 121 and the external tube 122, multilayer thermal insulator (Super Insulation) 123 is interposed and vacuumed. In addition, the outer periphery of the external tube 122 is covered by a corrosion-resistant layer 124 of polyvinyl chloride (PVC), polyethylene, or the like.

During steady operation of the superconducting cable 10, a cooling medium such as liquid nitrogen is circulated inside the internal tube 121, and thus transmitted electric current flows in the superconducting conductor layers 112 at a very low temperature.

The superconducting cable 10 is shipped from a factory and a cable line is constructed by coupling a plurality of superconducting cables 10 using intermediate connecting parts.

Figure 14:
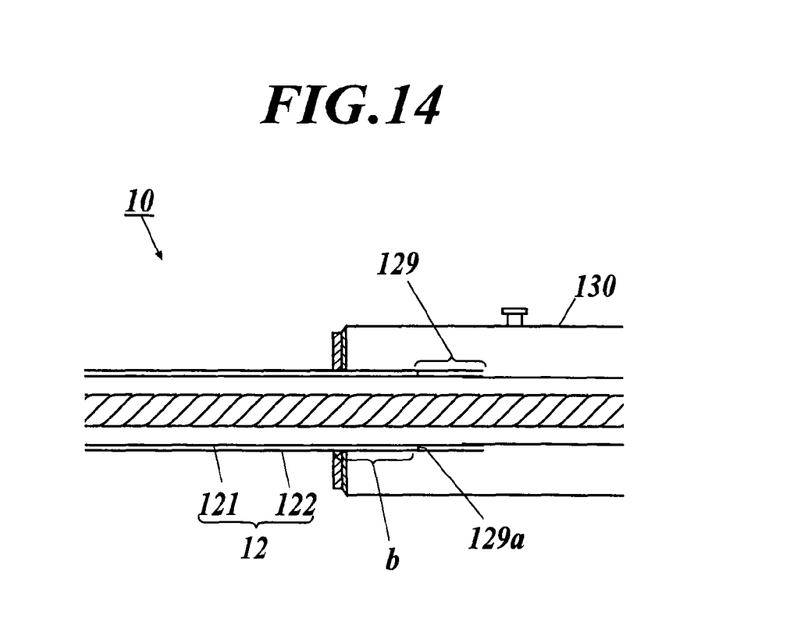
FIG. 14 is a schematic view illustrating a conventional connection structure between a superconducting cable and an intermediate connecting part.

In a conventional superconducting cable, a vacuum part is not sectioned and vacuum parts of the terminals, cables, and intermediate connecting parts are all connected. Alternatively, as illustrated in FIG. 14, the inside of the thermal insulation tube 12 of the superconducting cable 10 is vacuumed during the manufacturing stage, and at an end of the thermal insulation tube 12, a vacuum sectioned part 129 is formed in a certain length (about 3 to 5 m, for example) (the reference sign 129a designates a partition for sectioning). Then, there is proposed a method in which when the connecting parts are assembled on a site, only the sectioned part 129 is cutoff to break vacuum, the superconducting cable 10 is coupled to a double-structure thermal insulation container 130 as an intermediate connecting part while the vacuum state is maintained in the whole of the thermal insulation tube 12, and the superconducting cable 10 is coupled to another superconducting cable using this thermal insulation container 130, thereby performing processes for laying the superconducting cables (e.g., refer to Patent Literature 1).

PRIOR ART DOCUMENTS

Patent Literature

Patent Literature 1: JP 2010-165552 A

SUMMARY OF THE INVENTION

Problem to be Solved by the Invention

However, in the case where the vacuum part is not sectioned, the vacuum state is broken every time when an intermediate connecting part or a terminal connecting part is assembled. Therefore, the whole of the cable is vacuumed after the completion of assembling, which makes work time longer. On the other hand, when the superconducting cable described in the Patent Literature 1 is used, a length required upon laying superconducting cables has to be in a range that is adjustable by cutting the sectioned part 129 described above. Therefore, there is a problem of limitation in a usable length.

In addition, in the processes for laying the superconducting cables described in Patent Literature 1, the sectioned part 129 of the thermal insulation tube communicates with a thermal insulation region of the thermal insulation container 130, and vacuumed together with the thermal insulation region. As a result, heat invasion from the sectioned part 129 where vacuum is broken can be avoided. However, metal tubes are used for the internal tube 121 and the external tube 122 constituting the thermal insulation tube 12 for the issue of durability corresponding to severe temperature changes and the like. Thus, because of its high heat conductivity, there is a problem that heat penetrates to the inside of the thermal insulation tube 12 from a portion b of the external tube 122 via the partition 129a when the partition 129a for the sectioning is positioned close to the entrance of the thermal insulation container 130. Further, because the sectioned cable does not have a vacuum outlet, vacuuming is not possible, and thus out gas from the thermal insulation layer gradually degrades the degree of vacuum. In addition, a vacuum pump has to be permanently installed at each of the connecting parts in order to improve the degree of vacuum of the connecting parts.

An object of the present invention is to reduce heat invasion in a connection structure for superconducting cables.

Means to Solve the Problem

A first aspect of the invention is a connection structure for superconducting cables for connecting superconducting cables each having a cable core housed in a thermal insulation tube with a cooling medium by an intermediate connecting part, the cable core being provided with a former and a superconducting conductor layer. The thermal insulation tube of each of the superconducting cables has a double-structure constituted of a thermal insulation internal tube and a thermal insulation external tube, both of which are corrugated tubes, and the intermediate connecting part has a double-structure constituted of an outer container and an inner container. The thermal insulation internal tube and the thermal insulation external tube penetrate a wall surface of the outer container and introduced at least up to a wall surface of the inner container, an end to be introduced of the thermal insulation internal tube and an end to be introduced of the thermal insulation external tube are joined so as to seal each of a region between the thermal insulation internal tube and the thermal insulation external tube and a region between the outer container and the inner container. At an introduction portion of the thermal insulation external tube to be positioned inside of a wall surface of the outer container, a corrugated tubular part having a tube wall of a thickness thinner than a thickness of the thermal insulation external tube outside of the wall surface is provided. And the thermal insulation tube and the intermediate connecting part are provided with vacuum outlets, respectively, for vacuuming respective insides thereof.

In a second aspect of the invention, the vacuum outlet of the intermediate connecting part is provided on an outer wall surface of the outer container on a side through which the thermal insulation external tube penetrates, and the vacuum outlet of the thermal insulation tube is provided on an outer periphery of the thermal insulation external tube positioned outside the outer container in addition to the same structure as the first aspect of the invention.

In a third aspect of the invention, a cross-section shape, along a longitudinal direction of the thermal insulation external tube, of the corrugated tubular part at the introduction portion of the thermal insulation external tube is a wave shape having a large amplitude and a small wave pitch comparing to those of the thermal insulation external tube on outside in addition to the same structure as the first or second aspect of the invention.

In a fourth aspect of the invention, both of the vacuum outlet of the thermal insulation tube and the vacuum outlet of the intermediate connecting part are provided with switching valves capable of switching open/close in addition to the same structure as any one of the first to third aspects of the invention.

In a fifth aspect of the invention, the vacuum outlet of the thermal insulation tube and the vacuum outlet of the intermediate connecting part can be connected to each other in addition to the same structure as the fourth aspect of the invention.

A six aspect of the invention is a method for laying the connection structure for the superconducting cables according to the first aspect, in which each of the superconducting cables is adjusted to have a length to be connected to the intermediate connecting part, vacuuming is started from the vacuum outlet of the thermal insulation tube after a region between the thermal insulation internal tube and the thermal insulation external tube is sealed, and other laying steps are performed in parallel with the vacuuming.

A seventh aspect of the invention is a method for vacuuming the connection structure for the superconducting cables according to the fourth aspect, in which the plurality of superconducting cables and a plurality of the intermediate connecting parts are connected alternately, and the plurality of superconducting cables and the plurality of intermediate connecting parts are vacuumed at the same time in a state where the vacuum outlets of the superconducting cables and the intermediate connecting parts connected to each other are coupled and the switching valves thereof are open.

Advantageous Effects of the Invention

According to the present invention, a cutting position of the thermal insulation tube upon laying superconducting cables is not limited. Therefore, superconducting cables can be adjusted to any length.

In addition, the thermal insulation internal tube and a thermal insulation external tube are structured in such a way that ends of the respective tubes are connected to be sectioned from the outside and then the tubes are introduced into the intermediate connecting part. Therefore, an amount of heat invasion to the inside of the thermal insulation internal tube through the partition can be suppressed to be low comparing to the case where the thermal insulation internal tube and the thermal insulation external tube are previously partitioned, thereby high thermal insulation properties can be obtained.

Further, at an introduction portion of the thermal insulation external tube, the corrugated tubular part having a tube wall thinner than the thermal insulation external tube at the outside of the introduction portion is provided so as to make the heat transmission path be long and thin. Therefore, heat invasion to the inside can be more effectively reduced.

In addition, when the vacuum outlet of the intermediate connecting part is provided on the outer wall surface of the outer container on the side through which the thermal insulation external tube penetrates, and the vacuum outlet of the thermal insulation tube is provided on the outer periphery of the thermal insulation external tube positioned outside the outer container, the vacuum regions of the superconducting cables and the intermediate connecting parts can be easily connected through the respective vacuum outlets, and also an amount of heat invasion through the vacuum outlets can be reduced.

EMBODIMENTS TO CARRY OUT THE INVENTION (Outline of Embodiment)

Hereinafter, embodiments of the present invention will be described in detail based on the attached drawings.

Figure 1:
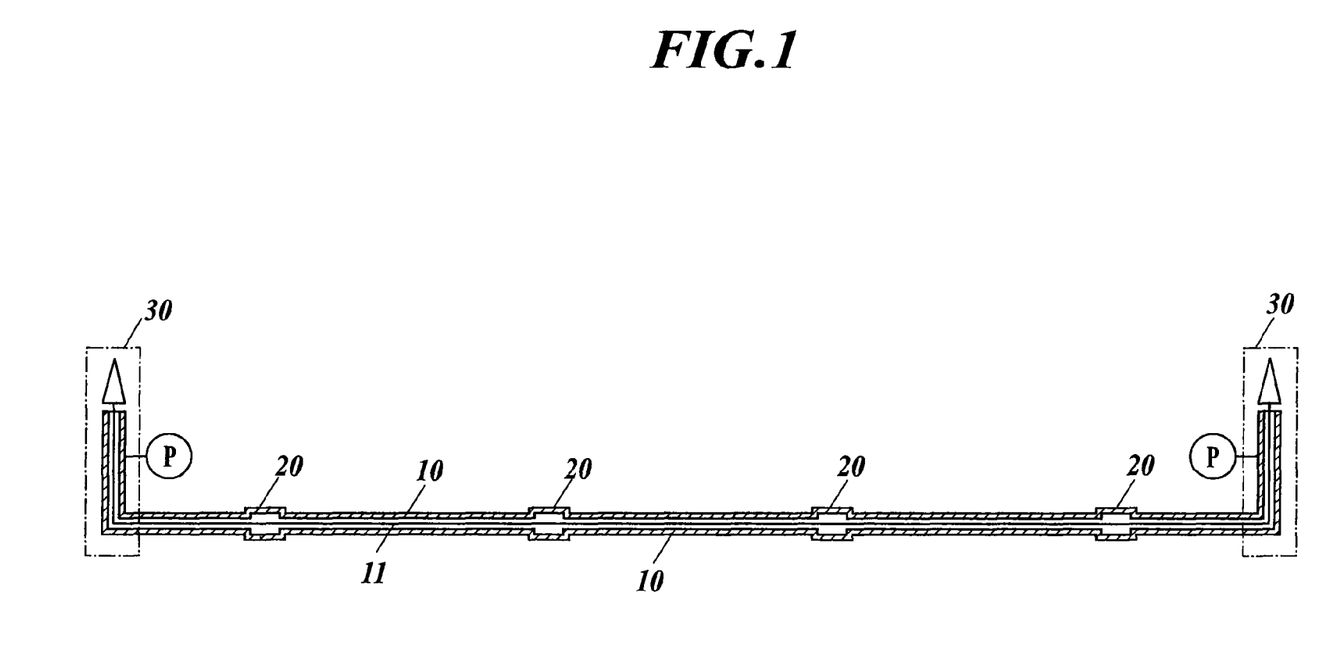
FIG. 1 is a schematic view illustrating an example of laying superconducting cables applied with a connection structure for superconducting cables according to an embodiment.

FIG. 1 is a schematic view illustrating an example of laying superconducting cables applied with a connection structure for superconducting cables according to an embodiment; and FIG. 2 is a view illustrating an example of a superconducting cable to be laid.

As illustrated in FIG. 1, superconducting cables 10 are laid in such a manner that terminal connecting parts 30, 30 provided at a power supply side and a destination side are connected by superconducting cables 10, and the superconducting cable 10 and the superconducting cable 10 are coupled by an intermediate connecting part 20. At the terminal connecting part 30, a pump P having a refrigerator is also provided to circulate a cooled liquid cooling medium along a thermal insulation tube 12, described later, of each of the superconducting cables 10 so as to cool a cable core 11 (described later).

This embodiment relates to a connection structure between the superconducting cable 10 and the intermediate connecting part 20.

(Superconducting Cable)

A superconducting cable 10 illustrated in FIG. 2 is a single-core superconducting cable, in which a cable core 11 as the single core is housed in a thermal insulation tube 12. The cable core 11 is composed of a former 111, superconductive conductor layers 112, an electric insulating layer 113, superconducting shield layers 114, a normal conducting shield layer 115, a protecting layer 116, and the like.

The former 111 is a core for winding to form the cable core 11, and may be structured by twisting normal conducting wire materials such as copper wires, for example, together. Into the former 111, fault current flowing through the superconductive conductor layers 112 upon short circuit is branched.

The superconductive conductor layers 112 are formed by winding a plurality of superconducting wire materials spirally on the former 111. In FIG. 2, the superconductive conductor layers 112 have a laminated structure of four layers. Through the superconductive conductor layers 112, transmitted electric current flows during a steady operation.

Each of superconducting wire materials for forming the superconductive conductor layers 112 has a laminated structure obtained by forming an intermediate layer, a superconducting layer, a protecting layer in this order on a tape-shaped metal substrate, for example. As a superconductor for forming the superconducting layer, a RE-based superconductor (RE: rare earth element) showing superconductivity at a liquid nitrogen temperature or more can be used. An example of such RE-based superconductor may be a Y-based superconductor expressed as the chemical formula $YBa_2Cu_3O_{7-\delta}$. In addition, a tape-shaped superconducting wire, in which a superconductor is formed in a metal matrix may be used. As a superconductor, a bismuth-based superconductor expressed by the chemical formula $Bi_2Sr_2CaCu_2O_{8+\delta}$ (Bi2212), or $Bi_2Sr_2Ca_2Cu_3O_{10+\delta}$ (Bi2223) can be used. In the chemical formula, $\delta$ indicates a nonstoichiometric amount of oxygen.

The electric insulating layer 113 is made of an insulating paper, a semi-synthesized paper obtained by joining an insulating paper and a polypropylene film, a polymer non-woven tape, or the like, for example and is formed by winding it on the superconductive conductor layers 112.

The superconducting shield layers 114 are formed by winding a plurality of superconducting wire materials spirally on the electric insulating layer 113. In FIG. 2, the superconducting shield layers 114 have a laminated structure of two layers. Substantially the same current as conductor current flows through the superconducting shield layers 114 in opposite phase by an electromagnetic induction during a steady operation. As the superconducting wire materials for forming the superconducting shield layers 114, superconducting wire materials similar to those for the superconductive conductor layers 112 may be used.

The normal conducting shield layer 115 is formed by winding a normal conducting wire such as a copper wire on the superconducting shield layers 114. Fault current flowing through the superconducting shield layers 114 upon short circuit is branched into the normal conducting shield layer 115.

The protecting layer 116 is made of an insulating paper, a polymer non-woven fabric, or the like, for example and is formed by winding it on the normal conducting shield layer 115.

The thermal insulation tube 12 has a double tube structure constituted of a thermal insulation internal tube 121 in which the cable core 11 is housed and which is filled with a cooling medium (liquid nitrogen, for example) and an insulation external tube 122 which is provided so as to cover the outer periphery of the insulation internal tube 121.

The insulation internal tube 121 and the insulation external tube 122 are, for example, stainless steel corrugated tubes. Between the insulation internal tube 121 and the insulation external tube 122, a multilayer thermal insulator (Super Insulation) 123 formed by a laminated body of polyethylene films on which aluminum is deposited, for example, is interposed, and a region therebetween is maintained in a vacuum state. In addition, the outer periphery of the insulation external tube 122 is covered by a corrosion-resistant layer 124 of polyethylene, or the like.

(Intermediate Connecting Part)

Figure 3:
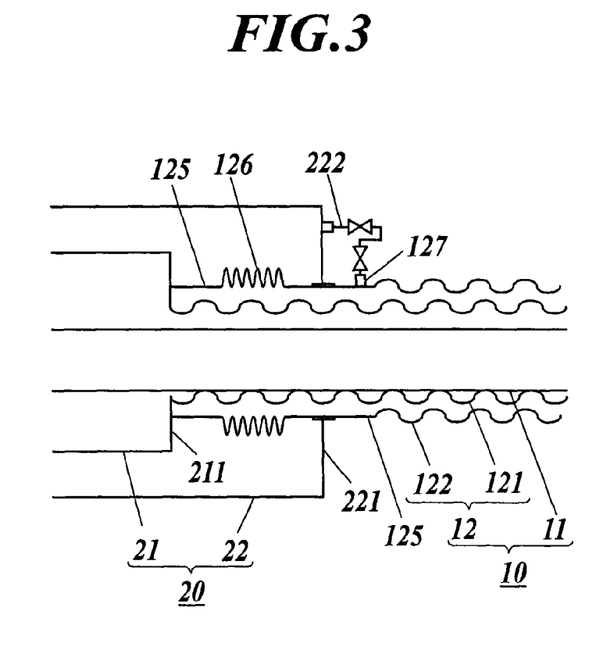
FIG. 3 is a schematic view illustrating connection structure between the superconducting cable and an intermediate connecting part.

FIG. 3 is a schematic view illustrating connection structure between the superconducting cable 10 and the intermediate connecting part 20.

The intermediate connecting part 20 has a double-structure constituted of a connecting thermal insulation internal tube 21 as an inner container on the inner side and a connecting thermal insulation external tube 22 as an outer container on the outer side. The connecting thermal insulation internal tube 21 and the connecting thermal insulation external tube 22 are made of stainless steel.

The connecting thermal insulation external tube 22 is tubular and formed with end wall surfaces 221 on the both ends in the center line direction (only one of them is illustrated in FIG. 3). The connecting insulation internal tube 21 is provided at the center inside the connecting thermal insulation external tube 22, tubular, and formed with end wall surfaces 211 on the both ends in the center line direction (only one of them is illustrated in FIG. 3).

The connecting thermal insulation external tube 22 is provided with a vacuum outlet 222 for vacuuming that is provided with a switching valve, which can switch open/close, on the both end wall surfaces 221 (on the outer wall surfaces of the connecting thermal insulation external tube 22 on a side through which the thermal insulation external tube 122 penetrates). This vacuum outlet 222 is used to vacuum the connecting thermal insulation external tube 22 when the connection structure is assembled upon laying the superconducting cables 10.

Upon laying the intermediate connecting part 20, the intermediate connecting part 20 is vacuumed from the vacuum outlet 222 with respect to a region between the connecting thermal insulation external tube 22 and the connecting thermal insulation internal tube 21, and is provided with a thermal insulation structure. Into the intermediate connecting part 20, ends of two superconducting cables 10 to be coupled are respectively introduced (refer to FIG. 1). The inner regions of the internal tubes 121 of the respective superconducting cables 10 and the inner region of the connecting thermal insulation internal tube 21 communicate through the end wall surface 211, and these inner regions are filled with a cooling medium. In the connecting thermal insulation internal tube 21, the ends of the cable cores 11 of the respective superconducting cables 10 are connected.

(Summary of Connection Structure for Superconducting Cables)

As described above, the superconducting cables 10 are respectively introduced into the intermediate connecting part 20 from the both ends and connected. Since the respective superconducting cables 10 have the same connection structure, the connection structure between only one of the superconducting cables 10 and the intermediate connecting part 20 will be described.

Both of the thermal insulation internal tube 121 and the thermal insulation external tube 122 of the superconducting cable 10 are drawn up to the end wall surface 211 of the connecting thermal insulation internal tube 21 of the intermediate connecting part 20 and are sealed by welding, for example, at the respective introduction ends so as to make the region between the thermal insulation internal tube 121 and the thermal insulation external tube 122 be in sealed state.

The thermal insulation internal tube 121 including a portion to be introduced into the intermediate connecting part 20 is uniformly formed by a corrugated tube. On the other hand, the thermal insulation external tube 122 is mainly formed by a corrugated tube on the outside of the intermediate connecting part 20 and is formed by a smooth tube 125 which is not corrugated (referred to as a connecting smooth tube 125 hereinafter) from a point before the intermediate connecting part 20 to the portion to be introduced.

On the connecting smooth tube 125, a bellows tube 126 is formed as a corrugated tubular part at a position inside the connecting thermal insulation external tube 22. The bellows tube 126 is designed to have a large amplitude (of waveforms) in the radius direction of the tube and to have a small wave pitch (period of waveforms) comparing to those of the corrugated tube of the thermal insulation external tube 122 on the outside of the intermediate connecting part 20. in addition, the bellows tube 126 is formed to have a thin tube wall comparing to that of the corrugated tube of the thermal insulation external tube 122 on the outside of the intermediate connecting part 20.

The connecting smooth tube 125 is provided with a vacuum outlet 127 for vacuuming that is provided with a switching valve capable of switching open/close at a position outside the connecting thermal insulation external tube 22. The vacuum outlet 127 is used to vacuum the thermal insulation tube 12 of the superconducting cable 10 when the connection structure is assembled upon laying these superconducting cables 10.

After the superconducting cables 10 is laid, the vacuum outlet 127 and the vacuum outlet 222 provided on the connecting thermal insulation external tube 22 of the intermediate connecting part 20 are coupled to be connected directly. As described above, the intermediate connecting part 20 is provided with the vacuum outlets 222 on the end wall surfaces 221 on the both sides of the connecting thermal insulation external tube 22. Thus, when the vacuum outlets are connected on the both sides of the intermediate connecting part 20, the insides (regions between the connecting thermal insulation external tubes 122 and the thermal insulation internal tubes 121) of the thermal insulation tubes 12 of the two superconducting cables 10 connected to the both sides of the intermediate connecting part 20 can be in a communicating state through the vacuum outlet 222 formed on the connecting thermal insulation external tube 22 of the intermediate connecting part 20 and the vacuum outlet 127 formed on the thermal insulation external tube 122. Therefore, by connecting all of the coupled superconducting cables 10 and intermediate connecting parts 20 as described above, the thermal insulation tubes 12 of the all superconducting cables 10 are in a communicating state, and thus the thermal insulation tubes 12 of the all superconducting cables 10 can be vacuumed by vacuuming from one end side upon maintenance when a degree of vacuum is degraded due to long-term use.

Further, since the switching valves, both of which are capable of switching open/close, are provided on the respective vacuum outlets 127 and 222, it becomes possible, by separating the vacuum outlet 127 from the vacuum outlet 222 with the valves closed, to check the degree of vacuum and vacuum upon degradation of the vacuum for the thermal insulation tube 12 of each of the superconducting cables 10 and for the connecting thermal insulation external tube 22 of each of the intermediate connecting parts 20. In addition, a superconducting cable 10 or an intermediate connecting part 20 having a defect can be separated alone.

(Method for Laying Connection Structures for Superconducting Cables)

Hereinafter, a method for laying the connection structures for the superconducting cables 10 structured as described above will be described in sequence.

First, preliminary steps to be performed on a fabrication site of the superconducting cable 10 (factory, for example) will be described based on FIGS. 4 to 8.

Figure 4:
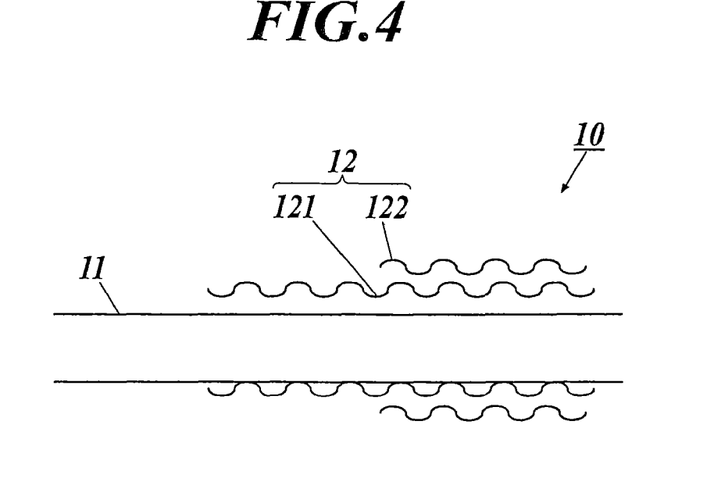
FIG. 4 is a view illustrating a step performed at a fabrication site as a method for laying a connection structure for the superconducting cable.

As illustrated in FIG. 4, the ends of the thermal insulation tube 12 are cut on the both ends of the superconducting cable 10.

Figure 5:
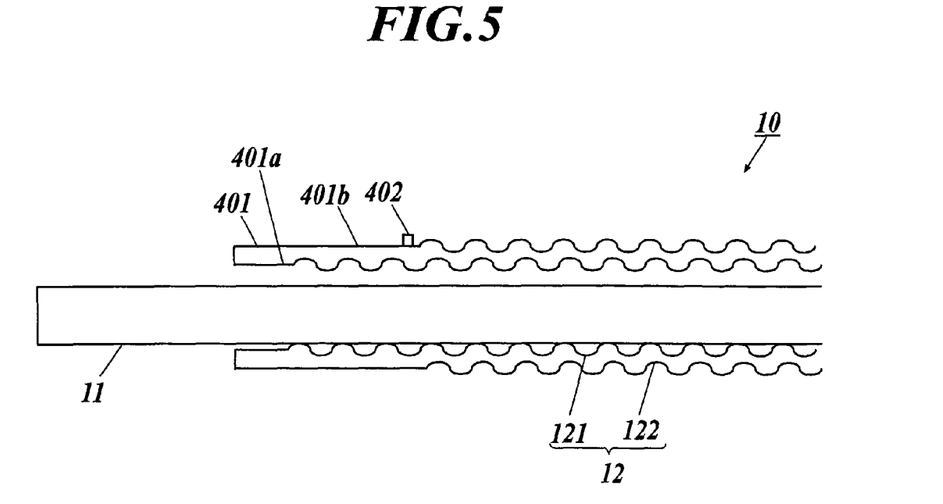
FIG. 5 is a view illustrating a step following the step illustrated in FIG. 4 performed at the fabrication site as the method for laying the connection structure for the superconducting cable.

Then, as illustrated in FIG. 5, a smooth tube 401a is welded to the front end of the thermal insulation internal tube 121, a smooth tube 401b is welded to the front end of the thermal insulation external tube 122, and the front ends of the smooth tube 401a and the smooth tube 401b are welded so as to seal off, whereby a double-structure smooth tube 401 with its front end part closed is connected in order to seal the region between the thermal insulation internal tube 121 and the thermal insulation external tube 122 of the thermal insulation tube 12 that has been cut. As the inner smooth tube 401a of the smooth tube 401, a smooth tube with a tube wall having the same thickness as that of the thermal insulation internal tube 121 is used and for the outer smooth tube 401b of the smooth tube 401, a smooth tube with a tube wall having the same thickness as that of the thermal insulation external tube 122 is used. On the outer smooth tube 401b of the smooth tube 401, a vacuum outlet 402 is provided, and the inside of the thermal insulation tube 12 is vacuumed from the vacuum outlet 402.

Figure 6:
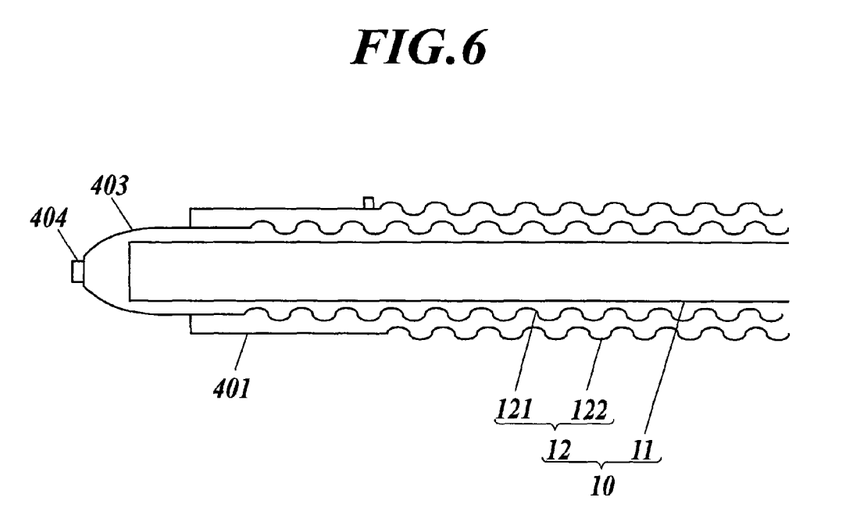
FIG. 6 is a view illustrating a step following the step illustrated in FIG. 5 performed at the fabrication site as the method for laying the connection structure for the superconducting cable.

Next, as illustrated in FIG. 6, the inner region of the thermal insulation internal tube 121 of the thermal insulation tube 12 is closed at one end of the superconducting cable 10 by a cap 403 substantially in the shape of a circular truncated cone. The cap 403 is also joined to the smooth tube 401 by welding. The cap 403 has a shape having its diameter reduced toward the front end part, and at the front end part, a vacuum outlet 404 is provided.

Figure 7:
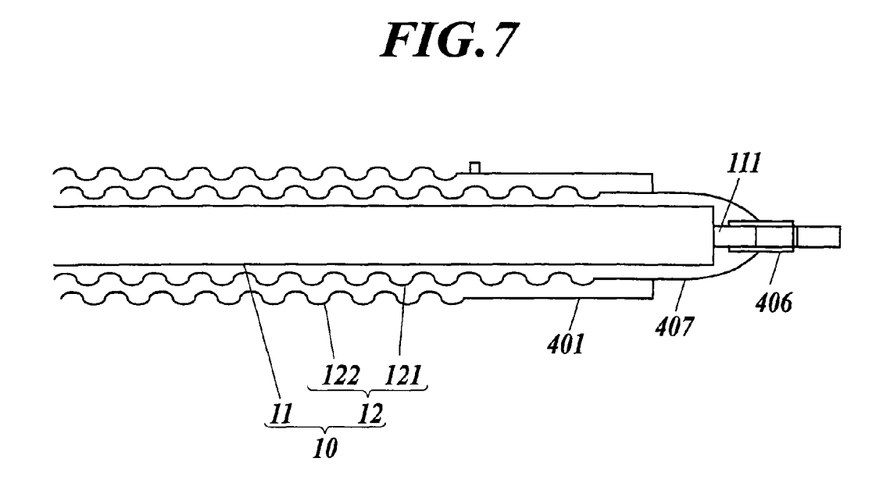
FIG. 7 is a view illustrating a step following the step illustrated in FIG. 6 performed at the fabrication site as the method for laying the connection structure for the superconducting cable.

On the other end of the superconducting cable 10, a pulling eye structure 405 is formed. The pulling eye structure 405 is provided to form a pulling eye structure, which is a patented invention disclosed in Japanese Patent No. 4330008, in particular. More specifically, as illustrated in FIG. 7, a sleeve 406 is joined by welding to the former 111 exposed from the cable core 11 of the superconducting cable 10, and a circular smooth tube 407 extending from the outer end of the sleeve 406 is joined by welding to the thermal insulation internal tube 121 through the internal tube of the smooth tube 401. The circular smooth tube 407 has a tube wall thickness larger than the thermal insulation internal tube 121 and smaller than the sleeve 406.

At the time when the circular smooth tube 407 is joined, the inner region of the thermal insulation internal tube 121 of the thermal insulation tube 12 of the superconducting cable 10 is in sealed state, and then it is vacuumed from the vacuum outlet 404 of the cap 403 illustrated in FIG. 6.

Figure 8:
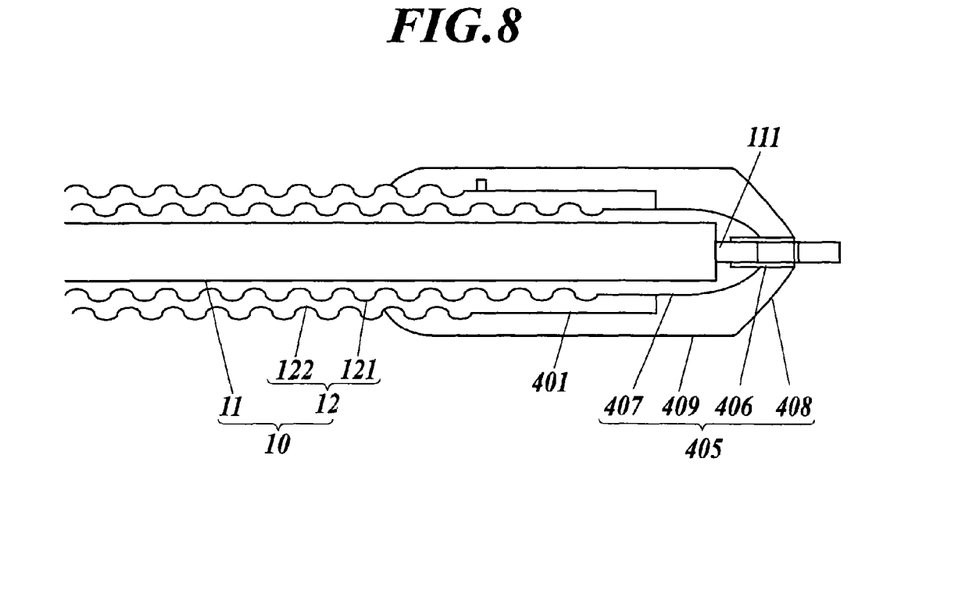
FIG. 8 is a view illustrating a step following the step illustrated in FIG. 7 performed at the fabrication site as the method for laying the connection structure for the superconducting cable.

Next, as illustrated in FIG. 8, a protecting tube 408 is joined by welding to the front end part of the pulling eye structure 405, and the protecting tube 408 and the thermal insulation external tube 122 are joined by welding with the circular smooth tube 409. The circular smooth tube 409 has a tube wall thickness larger than the thermal insulation external tube 122 and smaller than the protecting tube 408. Thus, the pulling eye structure 405 is completed.

When the degree of vacuum of the thermal insulation internal tube 121 becomes sufficiently high by vacuuming, dry gas having a low dew-point temperature ($N_2$ gas, for example) is filled from the vacuum outlet 404 so as to make the inside in a predetermined positive pressure state higher than the atmospheric pressure. With this process, a state where moisture in the inside is removed by vacuuming is maintained.

In regard to the region between the thermal insulation internal tube 121 and the thermal insulation external tube 122 of the thermal insulation tube 12, when the vacuum is sufficiently high, vacuuming is completed and the vacuum state may be maintained. Alternatively, similarly to the inner region of the thermal insulation internal tube 121, dry gas having a low dew-point temperature ($N_2$ gas, for example) may be filled from the vacuum outlet 402 so as to make the inside in a predetermined positive pressure state where the pressure is higher than the atmospheric pressure. With this process, a state where moisture in the inside is removed by vacuuming is maintained.

Hereinbefore, preprocessing to be performed at a fabrication site has been described. Hereinafter, the superconducting cables 10 are transported to a laying site.

Next, at a laying site, a laying process is performed by pulling the superconducting cable 10 using the pulling eye structure 405 to lay the superconducting cables.

Then, the positive pressure inside the thermal insulation internal tube 121 of the superconducting cable 10 is measured to check a defect such as leakage based on a difference from the initial positive pressure. If dry gas is filled in the region between the thermal insulation internal tube 121 and the thermal insulation external tube 122 of the thermal insulation tube 12, the check similar to that for the inside of the thermal insulation internal tube 121 is performed. If the superconducting cables 10 are transported while maintaining the region between the thermal insulation internal tube 121 and the thermal insulation external tube 122 of the thermal insulation tube 12 vacuum, the inner region is filled with dry gas having a low dew-point temperature ($N_2$ gas, for example) so as to restore to the atmospheric pressure.

Figure 9:
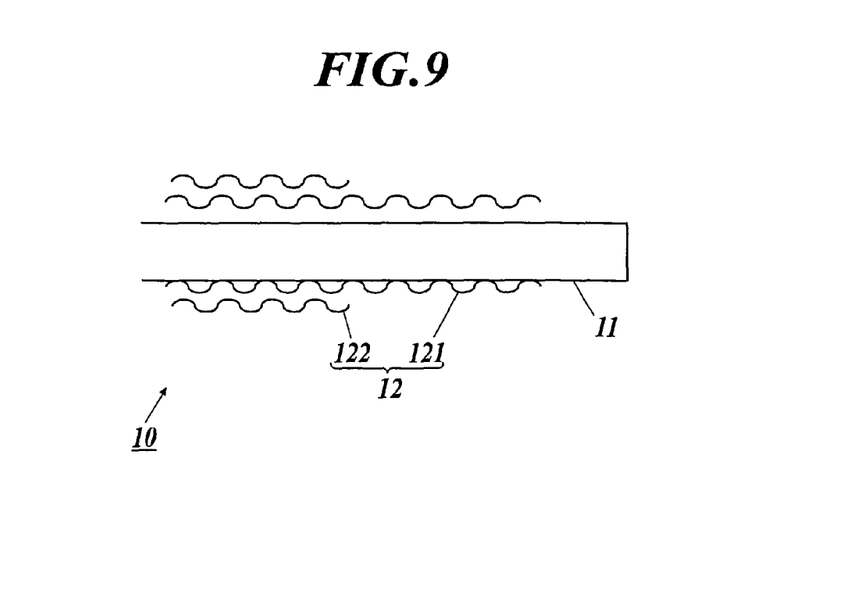
FIG. 9 is a view illustrating a step performed at a laying site of the connection structure as the method for laying a connection structure for the superconducting cable.

Next, as illustrated in FIG. 9, the pulling eye structure 405 is removed from the front end part of the superconducting cable 10. At this time, as to the thermal insulation external tube 122, only a part, to which the connecting smooth tube 125 is attached, is cut off comparing to the thermal insulation internal tube 121. However, the ends of the thermal insulation internal tube 121 and the thermal insulation external tube 122 may be aligned with each other. In such a case, when the connecting smooth tube 125 is joined to the thermal insulation external tube 122, a smooth tube is connected to the thermal insulation internal tube 121.

Figure 10:
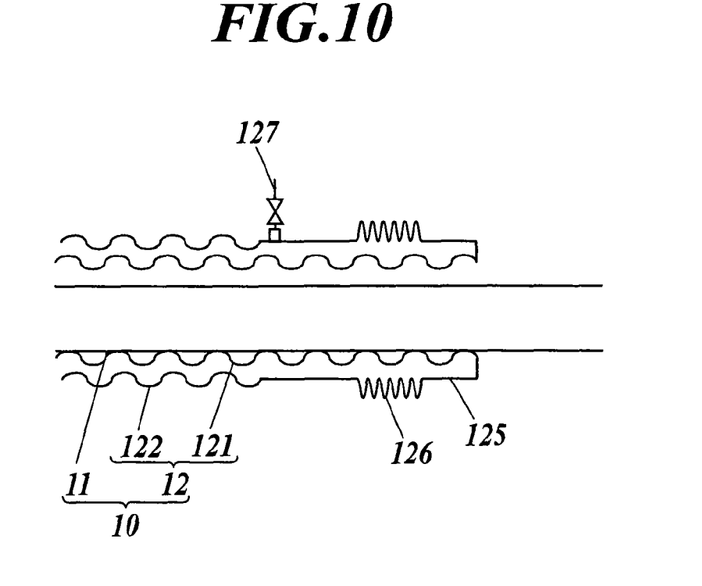
FIG. 10 is a view illustrating a step following the step illustrated in FIG. 9 performed at the laying site of the connection structure as the method for laying a connection structure for the superconducting cable.

Next, as illustrated in FIG. 10, the connecting smooth tube 125 already provided with the bellows tube 126 and the vacuum outlet 127 is joined to the thermal insulation tube 12. At this time, the inner edge of the front end part (which is closer to the connection end of the superconducting cable 10) of the connecting smooth tube 125 is welded to the front end part of the thermal insulation internal tube 121 with no gap therebetween, and the rear end part of the connecting smooth tube 125 is welded to the front end part of the thermal insulation external tube 122 with no gap therebetween.

Note that in regard to the other end of the superconducting cable 10 (refer to FIG. 6), a part of the thermal insulation tube 12 including the smooth tube 401 is removed from the front end part of the superconducting cable 10. At this time, as to the thermal insulation external tube 122, only a part, to which the connecting smooth tube 125 is attached, is cut off comparing to the thermal insulation internal tube 121. Then, the connecting smooth tube 125 already provided with the bellows tube 126 and the vacuum outlet 127 is joined to the thermal insulation tube 12.

When the smooth tubes for connection 125 are joined to the both ends of the superconducting cable 10, the thermal insulation tube 12 is in the state where the region between the thermal insulation internal tube 121 and the thermal insulation external tube 122 is sealed, and thus vacuuming is performed using the vacuum outlet 127 at the time. Since the superconducting cable 10 has been already vacuumed and also restored to the atmospheric pressure using dry gas having a low dew-point temperature, damp inside the superconducting cable 10 that would slow vacuuming has been removed, and thus the second vacuuming can be completed in a shorter time than usual.

During the vacuuming of the thermal insulation tube 12, a process for coupling the cable core 11 of the superconducting cable 10 and the cable core 11 of the other superconducting cable 10 connected to the intermediate connecting part 20 is performed.

Figure 11:
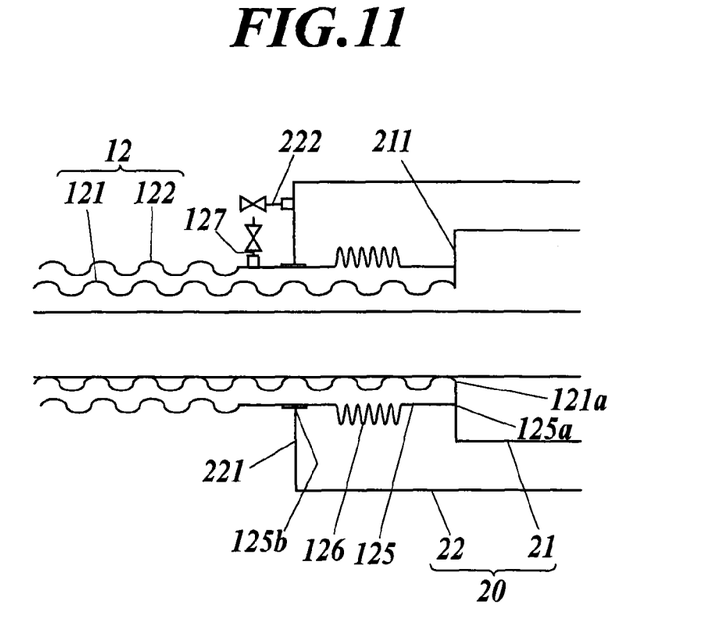
FIG. 11 is a view illustrating a step following the step illustrated in FIG. 10 performed at the laying site of the connection structure as the method for laying a connection structure for the superconducting cable.

After the coupling process is completed, the intermediate connecting part 20 is formed as illustrated in FIG. 11. Specifically, the outer edge 125a of the front end part of the connecting smooth tube 125 and the outer edge 121a of the front end part of the thermal insulation internal tube 121 are joined by welding to the inner edge of the end wall surface 211 of the connecting thermal insulation internal tube 21.

In addition, a position 125b between the bellows tube 126 of the connecting smooth tube 125 and the vacuum outlet 127 is joined by welding to the inner edge of the end wall surface 221 of the connecting thermal insulation external tube 22. Thus, the region between the connecting thermal insulation internal tube 21 and the connecting thermal insulation external tube 22 of the intermediate connecting part 20 becomes in a sealed state.

Upon the welding of the connecting smooth tube 125, the connecting thermal insulation internal tube 21, and the connecting thermal insulation external tube 22, each part is heated and thermal strain may be caused. However, because the bellows tube 126 can absorb expansion and contraction, occurrence of thermal strain can be prevented.

Then, the region between the thermal insulation internal tube 121 and the thermal insulation external tube 122 of the thermal insulation tube 12 is vacuumed, and when the degree of vacuum reached a predetermined value by the vacuuming, the switching valve of the vacuum outlet 127 is closed, and vacuuming is thereafter performed from the vacuum outlet 222 of the intermediate connecting part 20.

When the degree of vacuum of the intermediate connecting part 20 became almost the same as the degree of vacuum of the thermal insulation tube 12, the switching valve of the vacuum outlet 222 is once closed, and the vacuum outlet 127 of the thermal insulation tube 12 and the vacuum outlet 222 of the intermediate connecting part 20 are coupled (refer to FIG. 3). Thereafter, the both switching valves of the respective vacuum outlets 127, 222 are opened so that the region between the thermal insulation external tube 122 and the thermal insulation internal tube 121 of the thermal insulation tube 12 and the region between the connecting thermal insulation external tube 22 and the connecting thermal insulation internal tube 21 of the intermediate connecting part 20 communicate with each other.

When the connection structure to the intermediate connecting part 20 is formed for all superconducting cables 10, the inner region of the thermal insulation internal tubes 121 of the respective superconducting cables 10 and the thermal insulation internal tubes for connecting part 21 of the intermediate connecting parts 20 is filled with a liquid cooling medium (liquid nitrogen, for example). Thus, the steps for laying the connection structures for the superconducting cables are completed.

Upon the filling of the liquid nitrogen, the thermal insulation tube 12 contacts, but the bellows tube 126 can also absorb the contraction at the time and can reduce strain.

Technical Effect of an Embodiment

According to the connection structure for the superconducting cables 10 described above, a cutting position of the thermal insulation tube 12 upon laying the superconducting cables 10 is not limited. Therefore, the superconducting cable 10 can be adjusted to any length.

In addition, the thermal insulation internal tube 121 and the thermal insulation external tube 122 are structured in such a way that ends of the tubes introduced into the connecting part 20 are sealed to seal the thermal insulation tube 12. Therefore, comparing to the conventional structure in which the partition where the thermal insulation internal tube 121 and the thermal insulation external tube 122 are joined is provided in the middle, heat invasion to the inside of the thermal insulation internal tube 121 through the partition is prevented, and thus high thermal insulation properties can be obtained for the thermal insulation internal tube 121.

Further, since at the portion of the thermal insulation external tube 122 to be introduced, the bellows tube 126 having a tube wall thinner than the thermal insulation external tube 122 at the outer side of the portion is provided, the heat transmission path can be long and thin. Therefore, heat invasion to the inside can be effectively reduced.

In particular, since the cross-section shape of the bellows tube 126 along the center line direction of the tube is a wave shape having a large amplitude and a small wave pitch comparing to those of the corrugated tube of the thermal insulation external tube 122 on the outside of the intermediate connecting part 20, heat invasion to the inside can be more efficiently reduced.

In addition, the bellows tube 126 absorbs not only thermal expansion at the periphery thereof when heated for welding upon laying, but also thermal expansion and contraction caused by temperature change upon injection or discharge of a cooling medium, and thus stress generated inside the superconducting cable 10 and the intermediate connecting part 20 can be effectively reduced.

Figure 13:
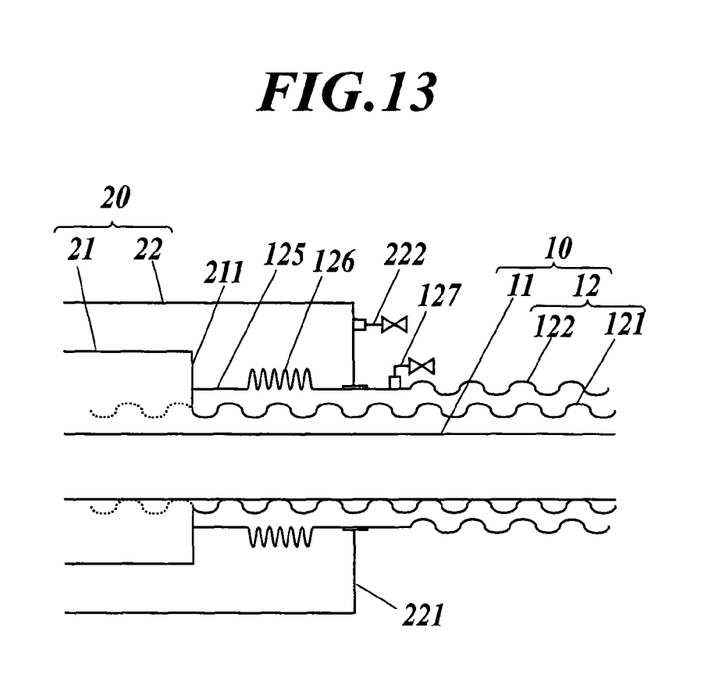
FIG. 13 is a view illustrating another example of a step following the step illustrated in FIGS. 12A and 12B performed at the fabrication site as the method for laying the connection structure for the superconducting cable.

Here, the bellows tube 126 is more specifically exemplified regarding to size and material. When it is assumed that the material of the connecting smooth tube 125 in FIG. 13 is SUS, a distance between the end wall surface 211 and the end wall surface 221 of the intermediate connecting part 20 is 200 mm, the outer diameter of the connecting smooth tube is 150 mm, and the thickness thereof is 1 mm, invasion heat when the bellows tube 126 is not provided is 5 W, but the invasion heat could be reduced to 0.1 W when the bellows tube 126 having a thickness of 0.1 mm and a length 100 mm (effective length: 1 m, amplitude: 50 mm, period: 10 mm, 10 cycles) is provided. As described above, the bellows tube 126 has been proved to have an excellent prevention effect against heat invasion.

In addition, the vacuum outlet 127 of the thermal insulation tube 12 is provided on the outer periphery of the portion to be positioned outside the connecting thermal insulation external tube 22 of the connecting smooth tube 125, and the vacuum outlet 222 of the intermediate connecting part 20 is provided on the end wall surface 221, through which the thermal insulation external tube 122 penetrates, of the connecting thermal insulation external tube 22. Therefore, the vacuum regions of the superconducting cable 10 and the intermediate connecting part 20 can be easily connected through the respective vacuum outlets 127, 222 thereof, and an amount of heat invasion through the vacuum outlets 127, 222 can be reduced.

In addition, both of the vacuum outlet 127 of the thermal insulation tube 12 and the vacuum outlet 222 of the intermediate connecting part 20 are provided with switching valves capable of switching open/close. Therefore, when the vacuum outlet 127 and the vacuum outlet 222 are coupled, vacuuming can be performed at once for the insides of all the thermal insulation regions in the system from one end of the whole superconducting cables 10.

Further, by opening/closing the appropriately selected respective vacuum outlets 127, 222, a location of failure recovery can be easily found. In this case, all sections are closed and the degree of vacuum of each portion may be monitored. Further, upon failure recovery, a part to be vacuumed along with the recovery can be limited by closing the vacuum sections other than the part.

In addition, upon laying the connection structure for the superconducting cables 10, after the superconducting cable 10 is cut to be adjusted to have a length to be connected to the intermediate connecting part 20 and the thermal insulation tube 12 whose vacuum was broken is sealed again, vacuuming is started from the vacuum outlet 127 of this thermal insulation tube 12 and in parallel with the vacuuming, other laying processes (connection of the cable cores 11, formation of the intermediate connecting parts 20, and the like) are performed, whereby work time can be reduced.

Other Examples in Laying Steps

Figure 12A:
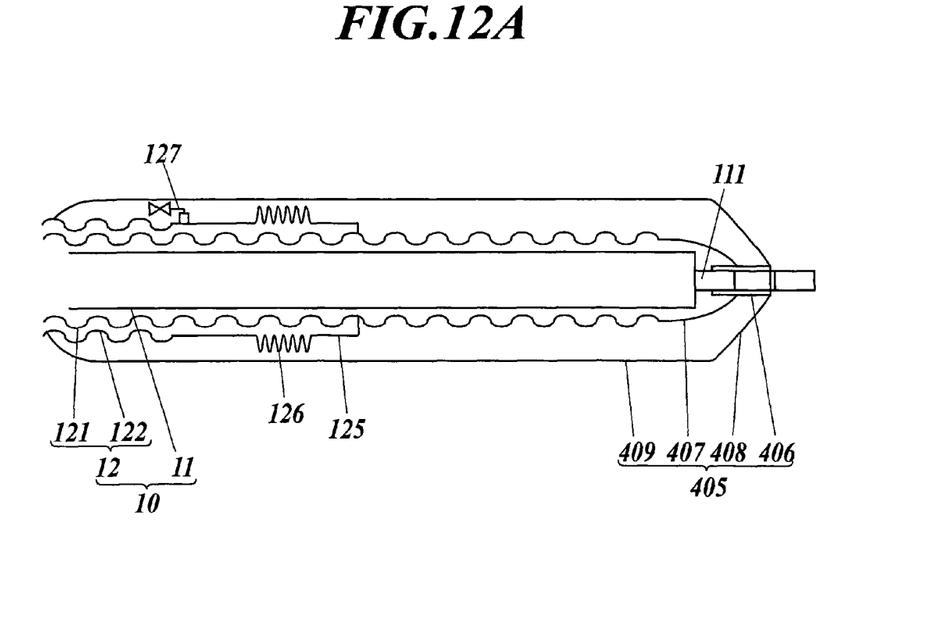
FIG. 12A is a view illustrating another example of a step performed at a fabrication site of the connection structure as the method for laying a connection structure for the superconducting cable, and illustrating a structure on one end of a superconducting cable to which a pulling eye structure is provided.
Figure 12B:
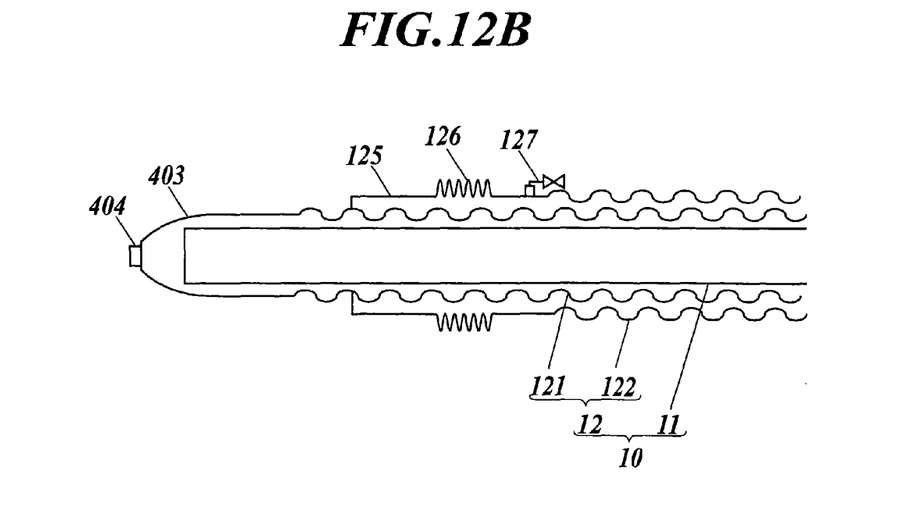
FIG. 12B is a view illustrating another example of the step performed at the fabrication site of the connection structure as the method for laying a connection structure for the superconducting cable, and illustrating a structure on the other end of the superconducting cable.

In the example of the steps for laying the connection structure for the superconducting cables 10 as described above, the connecting smooth tube 125 and the bellows tube 126 is not attached to the superconducting cable 10 at the stage in a fabrication site (factory), and the connecting smooth tube 125 and the bellows tube 126 are attached at the laying site. However, if the lengths of the superconducting cable 10 to be connected is exactly known beforehand, the length of the thermal insulation tube 12 may be adjusted, the connecting smooth tube 125 and the bellows tube 126 may be attached, and the inside of the thermal insulation tube 12 may be vacuumed at the stage in the fabrication site (factory). In this case, it is preferable that for the superconducting cable 10 in a state where the connecting smooth tube 125 and the bellows tube 126 are attached, the pulling eye structure 405 be provided in such a manner that the connecting smooth tube 125 and the bellows tube 126 are positioned inside the circular smooth tube 409 as illustrated in FIG. 12A, and the superconducting cables 10 in this state leave the factory for the laying site. Note that in regard to the opposite end of the superconducting cable 10 from the end illustrated in FIG. 12A, the cap 403 is connected by welding to the thermal insulation internal tube 121 of the thermal insulation tube 12 that has been cut and the connecting smooth tube 125 that is already provided with the bellows tube 126 and the vacuum outlet 127 is connected by welding to the thermal insulation external tube 122 as illustrated in FIG. 12B.

It is preferable that upon laying the superconducting cables 10, the pulling eye structure 405 is removed and a portion of the thermal insulation internal tube 121 from the joining part between the connecting smooth tube 125 and the thermal insulation internal tube 121 to the front end (dashed line part) is also removed as illustrated in FIG. 13, and thereafter the intermediate connecting part 20 is formed.

(Other Variations)

The invention made by the inventors has been described hereinbefore specifically based on the embodiment. However, the invention is not limited to the above embodiment and may be modified in the scope that does not deviate from the gist of the invention.

For example, for the bellows tube 126, a material other than metal materials may be used as long as the material can clear issues of durability and the like relating to temperature changes. For example, the bellows tube 126 can be formed of non-metal such as Teflon (registered trademark). In this case, the heat conductivity is lower than metals, and thus the length in the tube center line direction of the bellows tube 126 can be smaller. In addition, it is also possible to form the bellows tube 126 of a metal and to form the connecting smooth tube 125 of non-metal such as FRP in regard to portions other than the bellows tube 126.

In the above embodiment, the connection structure for the single-core superconducting cables 10 has been described, but the invention may be applied to a connection structure for an intermediate connecting part 20 of a 3-in-one superconducting cable having three cable cores collectively housed in a thermal insulation tube.

The all embodiments disclosed herein are exemplary in all respects and should not be regarded as limitations. The scope of the invention is indicated by the appended claims rather than by the foregoing description. All changes that come within the meaning and range of equivalency of the claims are to be embraced within the scope of the invention.

The present application claims priority to Japanese Patent Application No. 2011-014664 filed on Jan. 27, 2011, the contents of which including specification, claims, drawings and summary is incorporated herein by reference in its entirety.

Industrial Applicability

The invention is applicable in the field where a superconducting cable having a cable core stored in a thermal insulation tube with a cooling medium is connected to an intermediate connecting part.

REFERENCE SIGNS LIST 10 superconducting cable
11 cable core
111 former
112 superconducting conductor layer
113 electric insulating layer
114 superconducting shield layer
115 normal conducting shield layer
116 protecting layer
12 thermal insulation tube
121 thermal insulation internal tube
122 thermal insulation external tube
123 multilayer thermal insulator
124 corrosion-resistant layer
125 connecting smooth tube
126 bellows tube (corrugated tubular part)
127 vacuum outlet
20 intermediate connecting part
21 connecting thermal insulation internal tube (inner container)
221 end wall surface (outer end wall surface)
22 connecting thermal insulation external tube (outer container)
222 vacuum outlet

The invention claimed is:

1. A connection structure for superconducting cables for connecting superconducting cables each having a cable core housed in a thermal insulation tube with a cooling medium by an intermediate connecting part, the cable core being provided with a former and a superconducting conductor layer, wherein the thermal insulation tube has a double-structure constituted of a thermal insulation internal tube and a thermal insulation external tube, and the intermediate connecting part has a double-structure constituted of an outer container and an inner container, the thermal insulation internal tube and the thermal insulation external tube penetrate a wall surface of the outer container and introduced at least up to a wall surface of the inner container, an end to be introduced of the thermal insulation internal tube and an end to be introduced of the thermal insulation external tube are joined so as to seal each of a region between the thermal insulation internal tube and the thermal insulation external tube and a region between the outer container and the inner container, at an introduction portion of the thermal insulation external tube to be positioned inside of a wall surface of the outer container, a corrugated tubular part having a tube wall of a thickness thinner than a thickness of the thermal insulation external tube outside of the wall surface is provided, and the thermal insulation tube and the intermediate connecting part are provided with vacuum outlets, respectively, for vacuuming respective insides thereof.

2. The connection structure for superconducting cables according to claim 1, wherein the vacuum outlet of the intermediate connecting part is provided on an outer wall surface of the outer container on a side through which the thermal insulation external tube penetrates, and the vacuum outlet of the thermal insulation tube is provided on an outer periphery of the thermal insulation external tube positioned outside the outer container.

3. The connection structure for superconducting cables according to claim 1 or 2, wherein a cross-section shape, along a longitudinal direction of the thermal insulation external tube, of the corrugated tubular part at the introduction portion of the thermal insulation external tube is a wave shape having a large amplitude and a small wave pitch comparing to those of the thermal insulation external tube on outside.

4. The connection structure for superconducting cables according to claim 1 or 2, wherein both of the vacuum outlet of the thermal insulation tube and the vacuum outlet of the intermediate connecting part are provided with switching valves capable of switching open/close.

5. The connection structure for superconducting cables according to claim 4, wherein the vacuum outlet of the thermal insulation tube and the vacuum outlet of the intermediate connecting part can be connected to each other.

6. A method for laying the connection structure for the superconducting cables according to claim 1, wherein each of the superconducting cables is adjusted to have a length to be connected to the intermediate connecting part, vacuuming is started from the vacuum outlet of the thermal insulation tube after a region between the thermal insulation internal tube and the thermal insulation external tube is sealed, and other laying steps are performed in parallel with the vacuuming.

7. A method for vacuuming the connection structure for the superconducting cables according to claim 4, wherein the plurality of superconducting cables and a plurality of the intermediate connecting parts are connected alternately, and the plurality of superconducting cables and the plurality of intermediate connecting parts are vacuumed at the same time in a state where the vacuum outlets of the superconducting cables and the intermediate connecting parts connected to each other are coupled and the switching valves thereof are open.

* * * * *